UNITED STATES PATENT OFFICE.

CYPRIEN POULLALIER, OF NEW YORK, N. Y.

BITUMINOUS COMPOUND TO BE USED AS A CEMENT.

Specification forming part of Letters Patent No. 620, dated March 3, 1838.

*To all whom it may concern:*

Be it known that I, CYPRIEN POULLALIER, of the city of New York, in the State of New York, have discovered a new mode of combining certain materials in order to form a cement which I name my "Bituminous Composition;" and I do hereby declare that the following is a full and exact description.

The nature of my discovery consists in the production and manufacture, from the materials and in the mode hereinafter set forth, of an incorruptible, hard, elastic, and water-proof cement.

To enable others skilled in the art to make and use my cement, I will proceed to describe the materials of which it is composed, the mode of manufacturing and using it, together with some of its uses, which will be sufficient to indicate its nature and use.

To manufacture one hundred pounds of my bituminous composition I mix together ten pounds of the residue of bituminous coal, which remains after the gas has been extracted by the ordinary process of distillation and the coke removed or burned, which residue is commonly known as and is called "coal-tar;" ten pounds of the residue of common resin, after the gas has been extracted by the usual process; twenty pounds of pulverized brick; twenty pounds of the clay of which bricks are manufactured, and forty pounds of pulverized stone, of gravel, or of sand. For the finer kinds of the bituminous composition the stone, gravel, or sand should be finely pulverized. The whole should be boiled together in a cauldron and be well stirred for the space of three or four hours. It is then to be poured into molds and suffered to cool. When about to be used it should be melted in a cauldron and be laid on in a hot state, in the same manner as and with instruments similar to those used in the application of tar.

The bituminous composition is perfectly water-proof, and is eminently useful in rendering dry cellars and basements and in preventing the irruption of water. Applied as a lining, in its finer varieties, to metallic surfaces it preserves them from oxidation and the effects of the atmosphere and the wet. For cisterns, reservoirs, baths, vessels for washing, aqueducts, sidewalks, the coping of walls, tiling, and generally for all hydraulic purposes, I think it truly invaluable. Being very tenacious and elastic, it can be employed in much thinner coating than any other cement, and is not subject to be disintegrated by the contact of water, as other cements are in process of time from their essentially friable nature.

What I claim as my discovery, and desire to secure by Letters Patent, is—

The combination of the materials above mentioned—that is to say, of the residue of coal, which is commonly called "coal-tar," the residue of common resin after the gas has been extracted by the usual process, pulverized brick, brick-clay, and pulverized stone, gravel, or sand, in the above-mentioned proportions and in the above manner to produce a cement, or in similar proportions to produce the like result.

In testimony whereof I have hereunto set my hand in the presence of two witnesses, according to the provisions of the act in this behalf made and provided, this 28th day of December, in the year 1837.

CYPRIEN POULLALIER.

Witnesses:
CHAS. STUART,
GEO. K. OSBORN.